(12) United States Patent
Kao et al.

(10) Patent No.: US 8,847,902 B2
(45) Date of Patent: Sep. 30, 2014

(54) TOUCH PANEL AND METHOD FOR MANUFACTURING THE SAME

(75) Inventors: Huang-Chen Kao, Taoyuan County (TW); Sung-Chun Lin, Taichung (TW); Hsuan-Chen Liu, Kaohsiung (TW); Sweehan Jui-Hsien Yang, Tainan (TW); Chia-Hua Yu, New Taipei (TW)

(73) Assignee: Hannstar Display Corporation, New Taipei (TW)

( * ) Notice: Subject to any disclaimer, the term of this patent is extended or adjusted under 35 U.S.C. 154(b) by 299 days.

(21) Appl. No.: 13/423,260

(22) Filed: Mar. 18, 2012

(65) Prior Publication Data

US 2013/0127741 A1 May 23, 2013

(30) Foreign Application Priority Data

Nov. 21, 2011 (TW) .............................. 100142528 A

(51) Int. Cl.
*G06F 3/041* (2006.01)

(52) U.S. Cl.
CPC ..................................... *G06F 3/041* (2013.01)
USPC ......................................................... 345/173

(58) Field of Classification Search
CPC ......... G06F 3/041; G06F 3/042; G06F 3/044; G06F 3/045
USPC ........................................ 345/173, 174, 175
See application file for complete search history.

(56) References Cited

U.S. PATENT DOCUMENTS

| | | | | |
|---|---|---|---|---|
| 6,974,330 | B2 * | 12/2005 | Caldwell et al. | 439/66 |
| 7,002,239 | B1 * | 2/2006 | Nadarajah et al. | 257/666 |
| 7,196,696 | B2 * | 3/2007 | Li | 345/173 |
| 7,213,330 | B2 * | 5/2007 | Caldwell et al. | 29/832 |
| 8,436,823 | B2 * | 5/2013 | Kanehira et al. | 345/173 |
| 2005/0206624 | A1 * | 9/2005 | Li | 345/173 |
| 2006/0109258 | A1 * | 5/2006 | Takisawa | 345/173 |
| 2011/0122076 | A1 * | 5/2011 | Herman | 345/173 |
| 2011/0216014 | A1 * | 9/2011 | Wu et al. | 345/173 |
| 2012/0007832 | A1 * | 1/2012 | Lee et al. | 345/174 |

* cited by examiner

*Primary Examiner* — Fred Tzeng
(74) *Attorney, Agent, or Firm* — Li & Cai Intellectual Property (USA) Office

(57) ABSTRACT

A touch panel is disclosed. The touch panel includes a substrate, a touch sensing array, a first pad set, a second pad set, several first traces, and several second traces. The touch sensing array, the first pad set, the second pad set, the first traces, and the second traces are disposed on the substrate. The first pad set includes several first pads, and the second pad set includes several second pads. The touch sensing array locates between the first pad set and the second pad set, and the first pads and the second pads are in point symmetric arrangement with respective to the touch sensing array. The first traces are electrically connected between the first pads and the touch sensing array, and the second traces are electrically connected between the second pads and the touch sensing array.

29 Claims, 11 Drawing Sheets

TOUCH PANEL AND METHOD FOR MANUFACTURING THE SAME

BACKGROUND OF THE INVENTION

1. Field of the Invention

The present invention relates to an electrical input device; in particular, to a touch panel.

2. Description of Related Art

The present touch panel usually has a touch sensing array, a pad set, and several traces. The pad set is located beside the touch sensing array and includes a plurality of pads. The traces are electrically connected with the pads and the touch sensing array. The pad set is usually electrically connected with a flexible circuit board, so that the current or signals may be transmitted from the flexible circuit board to the touch sensing array through the pads and traces, for making the touch panel work.

The pad set is usually used for detecting whether the traces of the produced touch panel discontinue or not, in order to identify defective touch panels as many as possible. However, generally, a single piece of touch panel has only one pad set, thus the identified defective touch panel is hard to be reworked and is usually scrapped.

SUMMARY OF THE INVENTION

The object of the present invention is to provide a touch panel which has more than one pad sets.

The present invention further provides a method for manufacturing the touch panel.

In order to achieve the aforementioned objects, according to an embodiment of the present invention, a touch panel is provided. The touch panel includes a substrate, a touch sensing array, a first pad set, a second pad set, a plurality of first traces, and a plurality of second traces. The touch sensing array, the first pad set, the second pad set, the first traces, and the second traces are disposed on the substrate. The first pad set includes a plurality of first pads, and the second pad sets includes a plurality of second pads. The touch sensing array is located between the first pad set and the second pad set, and the first pads and the second pads are in a point symmetric arrangement with respect to the touch sensing array. The first traces are electrically connected between the first pads and the touch sensing array, and the second traces are electrically connected between the second pads and the touch sensing array.

In an embodiment of the present invention, the number of the first pads equals the number of the second pads.

In an embodiment of the present invention, an interval of two adjacent first pads equals to an interval of two adjacent second pads.

In an embodiment of the present invention, the two terminals of each first sensing strips and second sensing strips are respectively connected to one of the first traces and one of the second traces.

In an embodiment of the present invention, each of the first sensing strips includes several first sensing pattern units and several first connection wires. Each of the first connection wires is connected between two adjacent first sensing pattern units. Each of the second sensing strips includes several second sensing pattern units and several first connection wires, and the second connection wires are disposed above the first connection wires. Each of the second connection wires is connected between two adjacent second sensing pattern units.

In an embodiment of the present invention, the touch panel further includes an insulation pattern layer which covers the first sensing strips. Part of the insulation pattern layer covers the substrate. The second connection wires are disposed on the insulation pattern layer and are electrically connected with two adjacent second sensing pattern units.

In an embodiment of the present invention, the first traces and the second traces are in point symmetric arrangements with respect to the touch sensing array.

The present invention further discloses a touch panel which includes a substrate, a first pad set, a touch sensing array, a plurality of first traces, and a plurality of second traces. The substrate has a plane surface which has a straight line cutting edge. The first pad set includes several first pads and is disposed on the plane surface. The touch sensing array is disposed on the plane surface and is located between the straight line cutting edge and the pad set. The first traces are electrically connected between the first pads and the touch sensing array. The second traces are electrically between the touch sensing array and the straight line cutting edge, and extend from the touch sensing array to the straight line cutting edge.

In an embodiment of the present invention, the second traces are located between the straight line cutting edge and the first pad set.

In an embodiment of the present invention, the touch sensing array has a pair of first lateral sides which are relative to each other and a pair of second lateral sides which are relative to each other. The straight line cutting edge is juxtaposed with the first lateral sides, and the second traces extend from the adjacent first lateral side and second lateral side to the straight line cutting edge.

In an embodiment of the present invention, the distance between the touch sensing array and the straight line cutting edge is ranged between 2 mm to 10 mm.

In an embodiment of the present invention, a band-shaped region is located between the touch sensing array and the straight line cutting edge, and a shape of at least one invalid trace locating within the band-shaped region is a line or a polygonal line.

In an embodiment of the present invention, two terminals of each first sensing strip or second sensing strip are respectively connected to a valid trace and an invalid trace.

A method for manufacturing a touch panel is disclosed by the present invention. The method includes a step of forming a plurality of first sensing strips which are juxtaposed with one another and a plurality of second sensing pattern units. Each of the first sensing strips includes several first sensing pattern units and a plurality of first connection wires which connect the first sensing pattern units. Each of the first connection wires is located between two adjacent first sensing pattern units and two adjacent second sensing pattern units. The method further includes a step of forming an insulation layer covering the first sensing strips and the second sensing pattern units. The insulation layer includes several contact holes. Each of the second sensing pattern units is partially exposed by two of the contact holes, and each of the first sensing pattern units is partially exposed by one of the contact holes. After that, a step of forming several second connection wires on the insulation layer is included. Each of the second connection wires is connected between two adjacent second sensing pattern units through two of the contact holes. Thus the second connection wires and the second sensing pattern units may form a plurality of second sensing strips, and the second sensing strips are interlaced with the first sensing strips for forming a touch sensing array. Then, a step of forming a first pad set and a second pad set on the insulation layer is disclosed. The touch sensing array is located between the first pad set and the second pad set. The first pad set includes a plurality of first pads, and the second pad set includes a plurality of second pads. The first pads and the second pads are in point symmetric arrangement with respect to the touch sensing array. The method further includes a step of forming several first traces which connect with the first pads and several second traces which connect with the second pads. The first traces are connected to the first sensing pattern units through the contact holes, and each of the second traces is connected to one of the second sensing pattern unit through one of the contact holes.

In an embodiment of the present invention, steps of detecting the first traces through the first pad set, and detecting the second traces through the second pad set are included.

In an embodiment of the present invention, the method further includes steps of cutting the substrate for separating the first pad set from the touch sensing array when the detection result shows that the first trace is opened, and cutting the substrate for separating the second pad set from the touch sensing array when the detection result shows that the second trace is opened.

On the basis of the above, because the touch panel in the present invention has more than one pad sets (such as the first pad set and the second pad set), thus when one of the trace sets (such as first traces and second traces) is opened or broken while the others work normally, the touch panel may still operate normally and does not need to be scrapped.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1A:
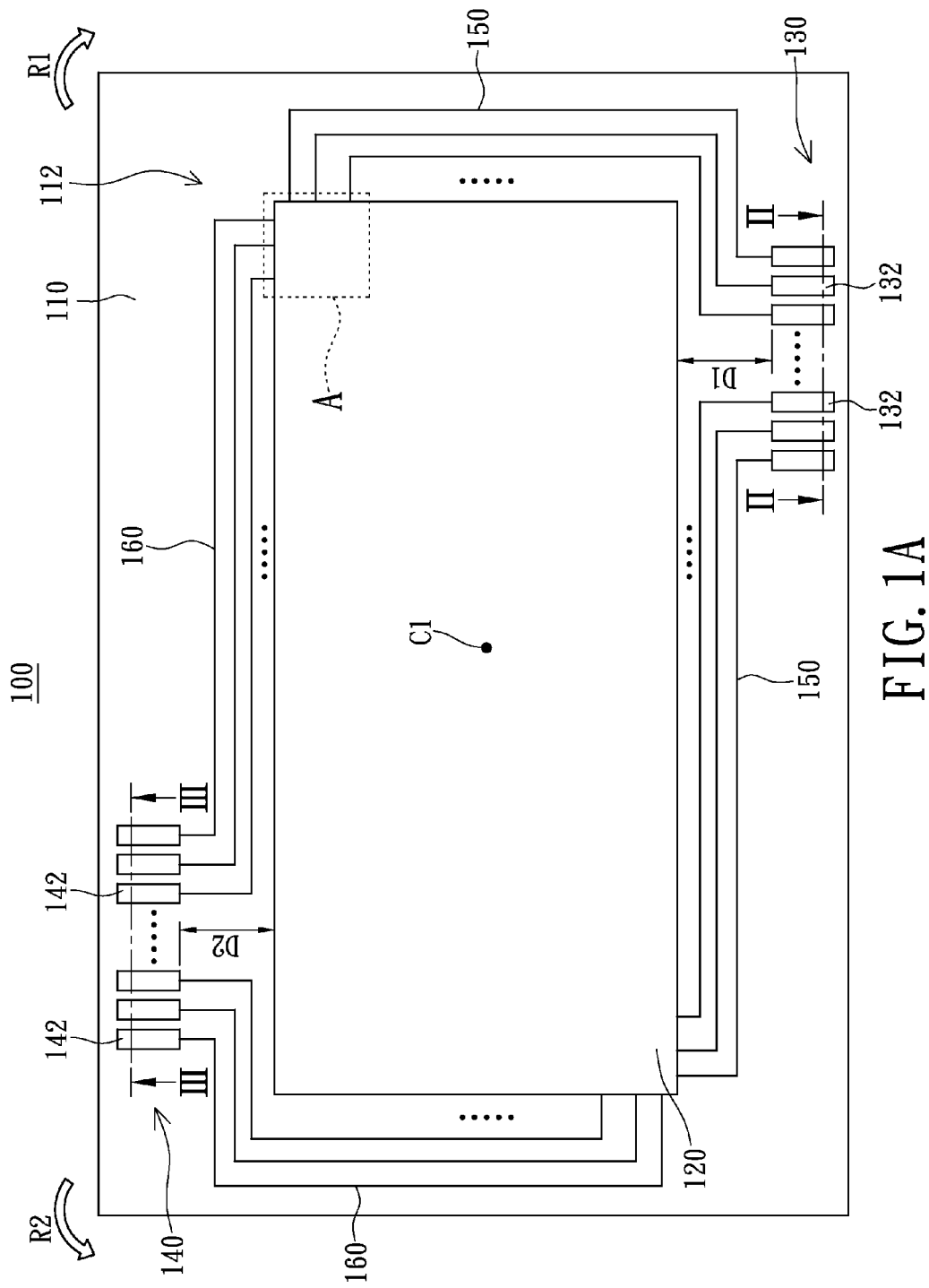
FIG. 1A shows a top view of a touch panel according to an embodiment of the present invention.

FIG. 1A shows a top view of a touch panel according to an embodiment of the present invention. Please refer to FIG. 1A, the touch panel 100 includes a substrate 110, a touch sensing array 120, a first pad set 130, a second pad set 140, several first traces 150, and several second traces 160. The touch sensing array 120, the first pad set 130, the second pad set 140, the first traces 150, and the second traces 160 are all disposed on the substrate 110.

The substrate 110 has a plane surface 112, and the touch sensing array 120, the first pad set 130, the second pad set 140, the first traces 150, and the second traces 160 are located on the plane surface 112. In addition, the substrate 110 may be a transparent substrate, such as a glass substrate or a transparent plastic substrate. The material of the transparent plastic substrate may be polymethylmethacrylate (PMMA), or so called acrylic, but the material is not limited thereby.

The touch sensing array 120 is located between the first pad set 130 and the second pad set 140. As shown in FIG. 1A, the first pad set 130 and second pad set 140 are located on relative side edges of the touch sensing array 120. The first pad set 130 includes several first pads 132, and the second pad set 140 includes several second pads 142. The first pads 132 and the second pads 142 may be used for electrically connecting a control circuit board (not shown), and the circuit board may be a flexible circuit board or a rigid circuit board.

The first pads 132 and the second pads 142 are in point symmetric arrangement with respect to the touch sensing array 120. As shown in FIG. 1A, the first pads 132 and the second pads 142 are arranged in point symmetry by using a center C1 of the touch sensing array 120 as the symmetric center. Thus the distance D1 from the first pad set 130 to the surrounded edge of the touch sensing array 120 approximately equals to the distance D2 from the second touch pad set 140 to the surrounded edge of the touch sensing array 120. In addition, the first traces 150 and the second traces 160 may also in a point symmetric arrangement with respective to the touch sensing array 120, that is, the first traces 150 and the second traces 160 are arranged basically by using the center C1 as the symmetric center.

The first pads 132 and the second pads 142 are in a point symmetric arrangement with respect to the touch sensing array 120. After the touch panel 100 in FIG. 1A is rotated in clockwise direction R1 by 180 degrees or in counterclockwise direction R2 by 180 degrees, the rotated second pad set 140 may locate at the position of the first pad set 130 before it is rotated, and the rotated first pad set 130 may locate at the position of the second pad set 140 before it is rotated. That is, the positions of the first pad set 130 and the second pad set 140 are interchanged with each other.

When the number of the first pads 132 equals to the number of the second pads 142, basically, each rotated first pad 132 may overlap or coincide with one of the second pads 142 before it is rotated, and each rotated second pad 142 may overlap or coincide with one of the first pad 132 before it is rotated. In addition, the first pads 132 and the second pads 142 may be arranged in a line along the surrounding edges of the touch sensing array 120. In this embodiment, the number of the first pads 132 may equal to the number of the second pads 142, but in other embodiments, the number of the first pads 132 may not equal to the number of the second pads 142. In the latter case, part of the rotated first pads 132 may overlap with the second pads 142 before they are rotated.

Similarly, the first traces 150 and the second traces 160 on the substrate 110 are in a point symmetric arrangement with respect to the touch sensing array 120. After the touch panel 100 in FIG. 1A is rotated in clockwise direction R1 by 180 degrees or in counterclockwise direction R2 by 180 degrees, the rotated second traces 160 may locate at the position of the first traces 150 before they are rotated, and the rotated first traces 150 may locate at the position of the second traces 160 before they are rotated. That is, the positions of the first traces 150 and the second traces 160 are interchanged with each other.

Similarly, when the number of the first traces 150 equals to the number of the second traces 160, each rotated first trace 150 may overlap or coincide with one of the second traces 160 before it is rotated, and each rotated second trace 160 may overlap or coincide with one of the first trace 150 before it is rotated. In addition, the first traces 150 and the second traces 160 may be arranged and extended in parallel lines along the surrounding edges of the touch sensing array 120. In this embodiment, the number of the first traces 150 may equal to the number of the second traces 160, but in other embodiments, the number of the first traces 150 may not equal to the number of the second traces 160. In the latter case, part of the rotated first traces 150 may overlap with the second traces 160 before they are rotated.

The first traces 150 are electrically connected between the first pads 132 and the touch sensing array 120, and the second traces 160 are electrically connected between the second pads 142 and the touch sensing array 120. When the first pads 132 or the second pads 142 are electrically connected to the circuit board, the electric signals may be transmitted between the circuit board and the touch sensing array 120 through the first pad set 130 and the first traces 150 or through the second pad set 140 and the second traces 160, for making the touch panel 100 work.

Figure 1B:
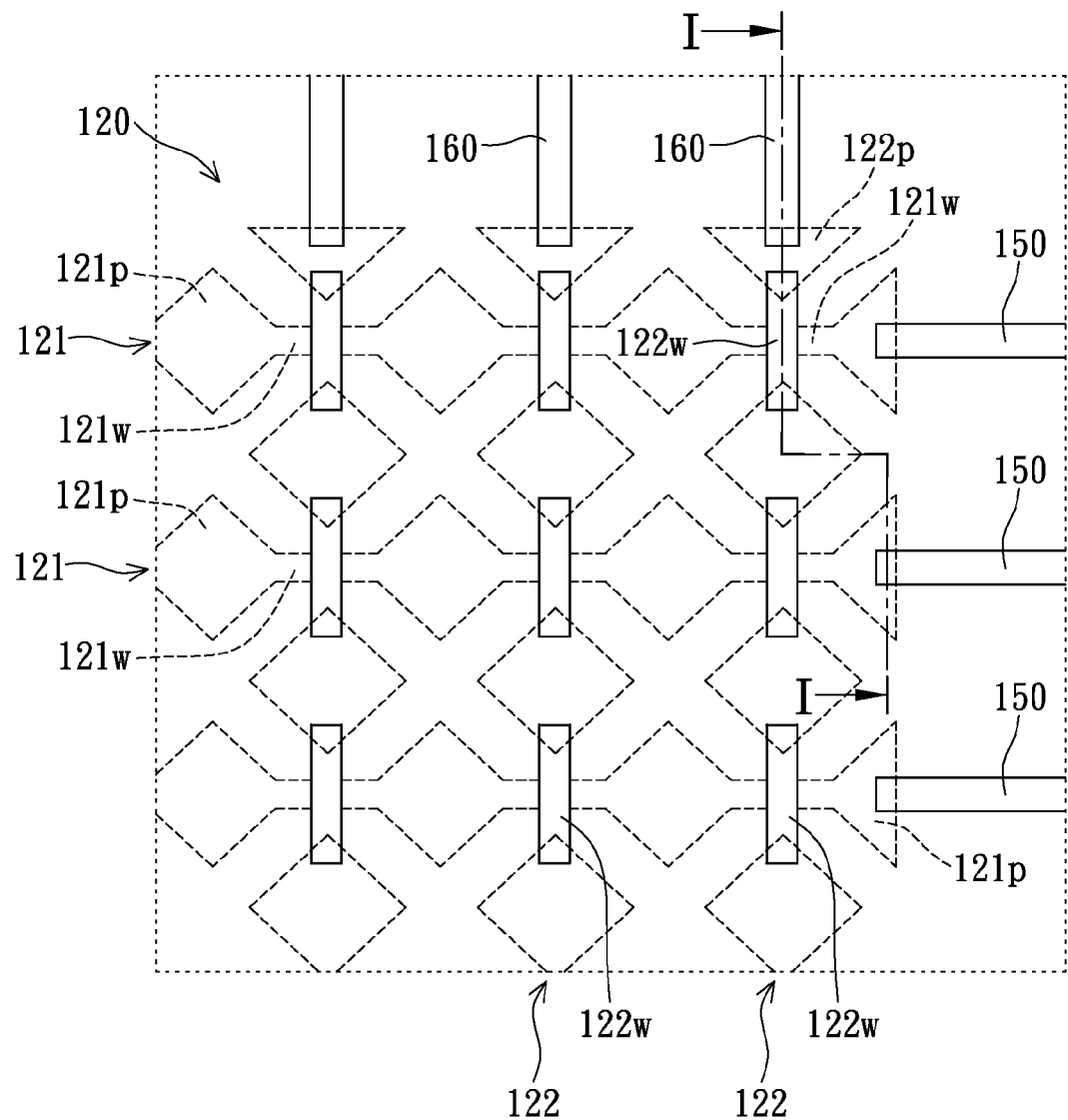
FIG. 1B shows a partially enlarged diagram of the region A in FIG. 1A.
Figure 1C:
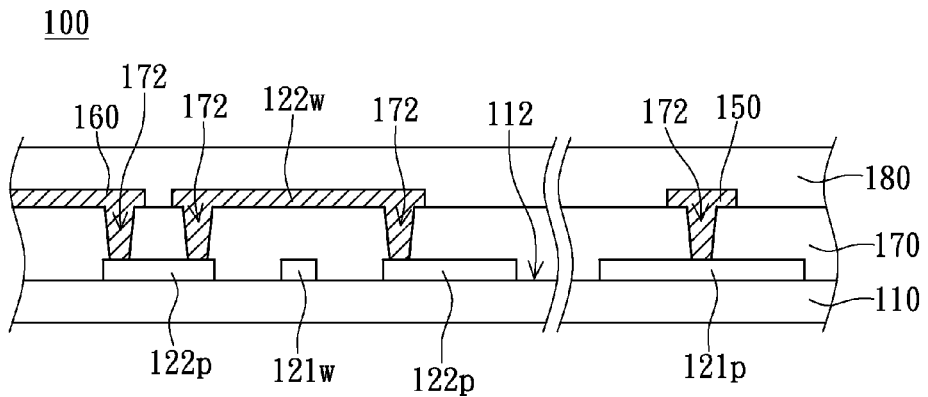
FIG. 1C shows a cross section diagram along the line I-I of FIG. 1B.

FIG. 1B shows a partially enlarged diagram of the region A of FIG. 1A, and FIG. 1C shows a cross section diagram along the line I-I in FIG. 1B. Please refer to FIGS. 1B and 1C, the touch sensing array 120 may include several first sensing strips 121 which are juxtaposed with one another and several second sensing strips 122 which are juxtaposed with one another. The stretch of the first sensing strips 121 is different from the stretch of the second sensing strips 122, and the first sensing strips 121 are interlaced with the second sensing strips 122. Please refer to FIG. 1A along with FIGS. 1B and 1C, the two terminals of the first sensing strip 121 or the second sensing strip 122 are electrically connected to the first trace 150 and the second trace 160 respectively. For example, please see the first sensing strip 121 in transverse direction at the top of FIG. 1B, its right terminal is electrically connected with a first trace 150, and its left terminal is electrically connected with a second trace 160 (not shown). Similarly, please see the second sensing strip 122 in vertical direction at the left of FIG. 1B, its top terminal is electrically connected to a second trace 160, and its bottom terminal is electrically connected to a first trace 150 (not shown).

In the embodiment of FIG. 1B, the stretches of the first sensing strips 121 may be transverse directions, and the stretches of the second sensing strips 122 may be vertical directions. However, in other embodiments, the stretches of the first sensing strips 121 may be vertical directions, and the stretches of the second sensing strips 122 may be transverse directions. Thus, the stretches of the first sensing strips 121 and the second sensing strips 122 in FIG. 1B are only for exemplary descriptions, and the present invention is not limited thereby.

Each first sensing strip 121 may include a plurality of first sensing pattern units 121p and several first connection wires 121w, and each second sensing strip 122 may include several second sensing pattern units 122p and several second connection wires 122w. The first sensing pattern units 121p, the second sensing pattern units 122p, and the first connection wires 121w are disposed on the substrate 110 and locate on the plane surface 112. The second connection wires 122w are respectively disposed above the first connection wires 121w.

In addition, the first sensing pattern units 121p and the second sensing pattern units 122p may be in a matrix arrangement.

Each first connection wire 121w is connected between two adjacent first sensing pattern units 121p, and is located between two adjacent first sensing pattern units 121p and two adjacent second sensing pattern units 122p. Each second connection wire 122w is connected between two adjacent second sensing pattern units 122p. The second connection wires 122w may be several metal lines but they are not limited thereby. In addition, in FIG. 1B, each first trace 150 is connected with one of the first sensing strips 121, and each second trace is connected with one of the second sensing strips 122.

The touch panel 100 may further include an insulation layer 170 for covering the first sensing strips 121, the substrate 110, and the second sensing pattern units 122p. The second connection wires 122w, the first traces 150, and the second traces 160 are disposed on the insulation layer 170. The insulation layer 170 may have several contact holes 172. Each second connection wires 122w is connected between two adjacent second sensing pattern units 122p through two of the contact holes 172, that is, each second connection wire 122w extends into the contact holes 172 or via any kind of conductive materials, in order to connect two adjacent second sensing pattern units 122p.

The first traces 150 are respectively extending into corresponding contact holes 172 or via any kind of conductive materials, for electrically and respectively connecting the corresponding first sensing strips 121 or second sensing strips 122. Similarly, the second traces 160 are respectively extending into corresponding contact holes 172 or via any kind of conductive materials, for electrically and respectively connecting the corresponding first sensing strips 121 or second sensing strips 122. Therefore, the first traces 150 and the second traces 160 may be able to electrically connect the touch sensing array 120.

In addition, in this embodiment, the touch panel 100 may further include a protection layer 180 for covering the second connection wires 122w and the insulation layer 170. The protection layer 180 has electrical insulation capability, and the protection layer 180 may be formed by using much harder materials, in order to protect the second connection wires 122w. However, even if the touch panel 100 does not have any protection layer 180, the operations of the touch panel 100 is not influenced thereby. Therefore, in other embodiments, the touch panel 100 may not have any protection layer 180. Thus, the protection layer 180 shown in the figure (such as FIG. 1C) is just for exemplary descriptions, and the scope of the present invention is not limited thereby.

Figure 1D:
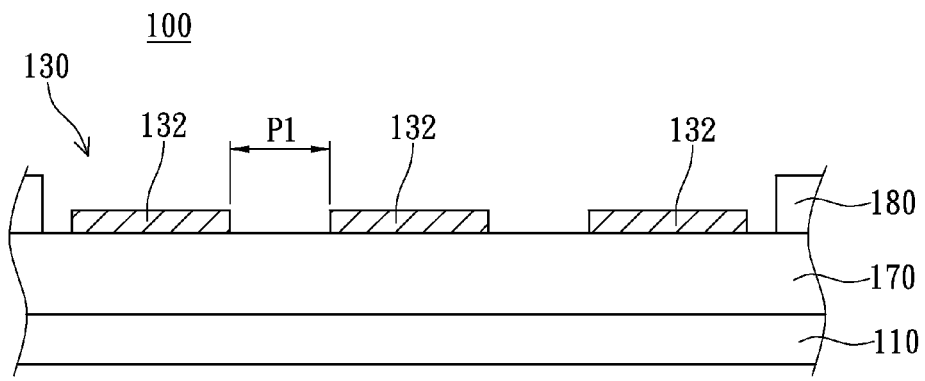
FIG. 1D shows a cross section diagram along the line II-II of FIG. 1A.
Figure 1E:
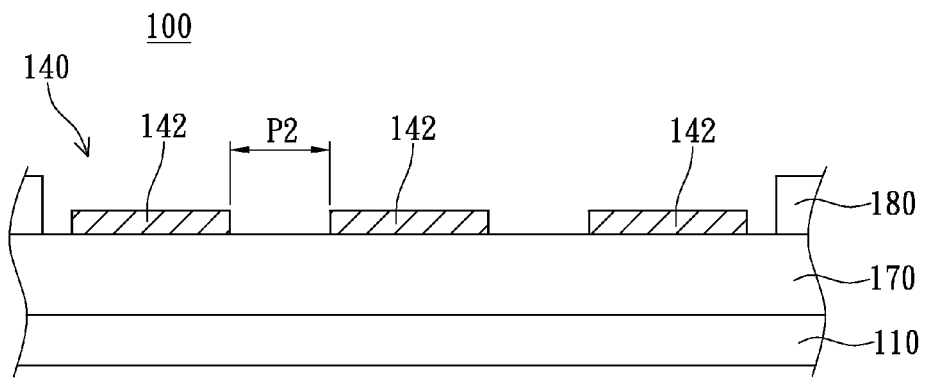
FIG. 1E shows a cross section diagram along the line III-III of FIG. 1A.

FIG. 1D shows a cross section diagram along the line II-II in FIG. 1A, and FIG. 1E shows a cross section diagram along the line III-III in FIG. 1A. Please refer to FIGS. 1A, 1D, and 1E, the first pad set 130 and the second pad set 140 may be disposed on the insulation layer 170, as shown in FIGS. 1D and 1E. In addition, the interval P1 between two adjacent first pads 132 may equal to the interval P2 between two adjacent second pads 142. It is worth noting that, as shown in FIG. 1D, the protection layer 180 has at least one opening for exposing the first pad set 130, for allowing the first pad set 130 to electrically connect with control circuit board. Similarly, as shown in FIG. 1E, the protection layer 180 also has at least one opening for exposing the second pad set 140, for allowing the second pad set 140 to electrically connect with control circuit board.

The aforementioned descriptions are mainly about the structures of the touch panel 100, and the following descriptions and figures are going to describe the manufacturing method of the touch panel 100.

FIGS. 2A to 2J show cross section flow charts of manufacturing method of the touch panel in FIG. 1A. Please refer to FIGS. 2A and 2B, in the manufacturing method of the touch panel 100, a step of forming a plurality of first sensing strips 121 and several second sensing pattern units 122p is included. The first sensing strips 121 and the second sensing pattern units 122p may be formed by patterning a conductive layer 12.

Specifically, the conductive layer 12 may be formed on the substrate 110 in advance. The conductive layer 12 may be able to cover the plane surface 112 thoroughly, and may be a transparent conductive layer. In addition, the materials of the conductive layer 12 may be indium tin oxide (ITO) or indium zinc oxide (IZO). Then, the conductive layer 12 may be patterned for partially exposing the plane surface 112. The patterning manners may be implemented by photolithography or etching.

Figure 2A:
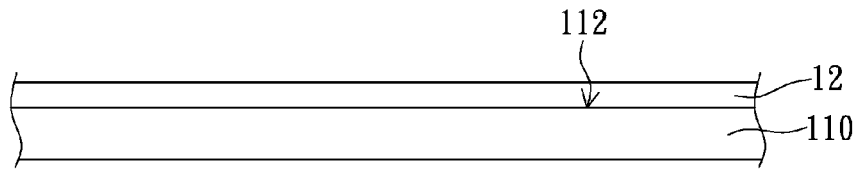
FIG. 2A to 2J show cross section flow charts of the manufacturing method of the touch panel in FIG. 1A.
Figure 2B:
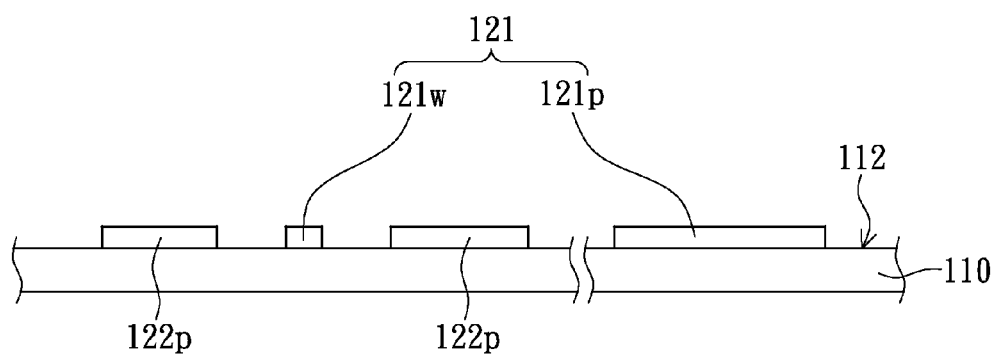
Figure 2C:
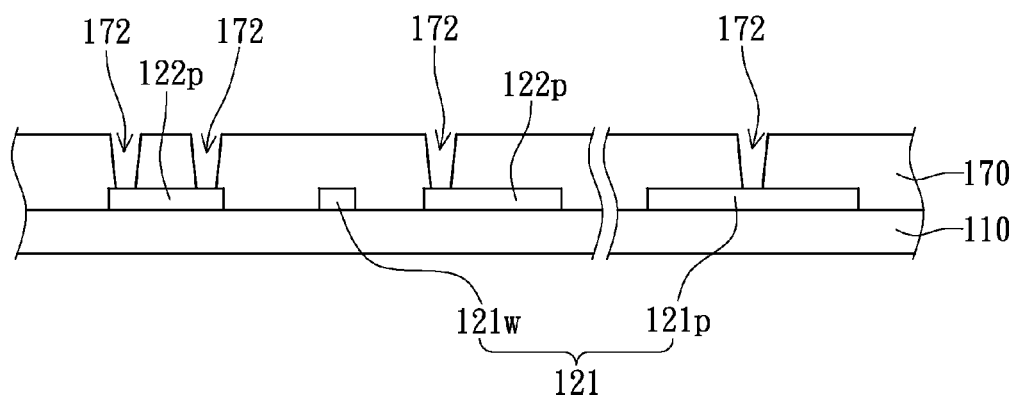
Figure 2D:
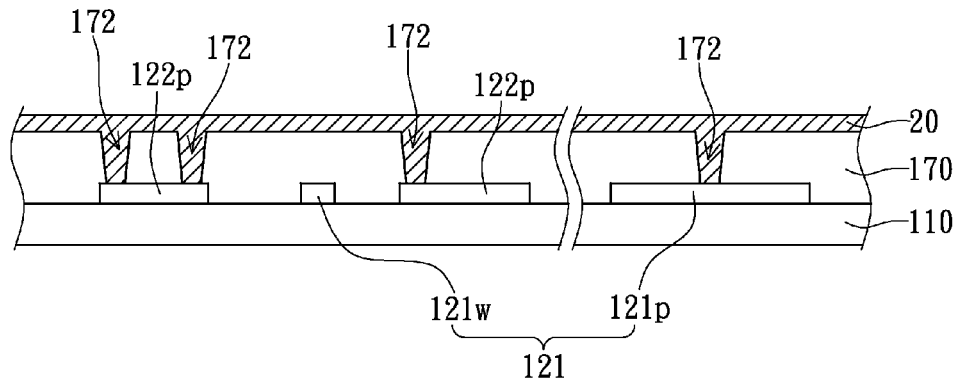

Please refer to FIG. 2C, a step of forming an insulation layer 170 is included in the method. The insulation layer 170 covers the first sensing strips 121 (which includes the first sensing pattern units 121p and the first connection wires 121w) and the second sensing pattern units 122p, and has several contact holes 172 therein. The contact holes 172 may be formed by photolithography or etching.

Some formed contact holes 172 may partially expose the first sensing pattern units 121p and the second sensing pattern units 122p. Each second sensing pattern unit 122p is partially exposed by one or two contact holes 172 (please refer to FIGS. 1B and 2C), and each first sensing pattern unit 121p is partially exposed by one of the contact holes 172.

Figure 2E:
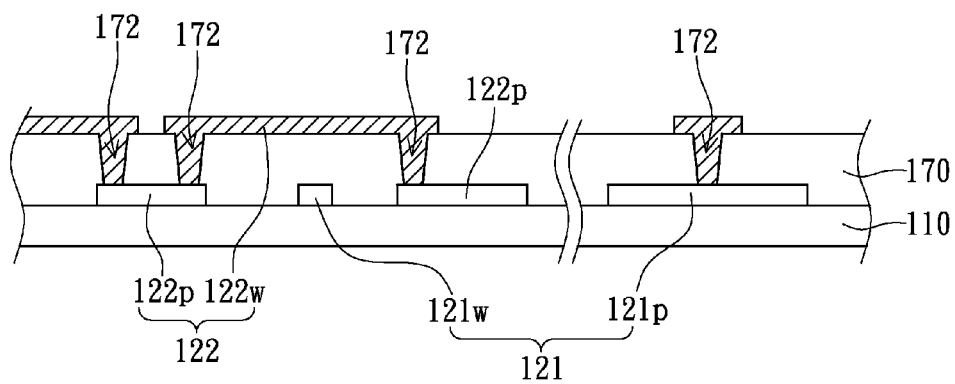
Figure 2F:
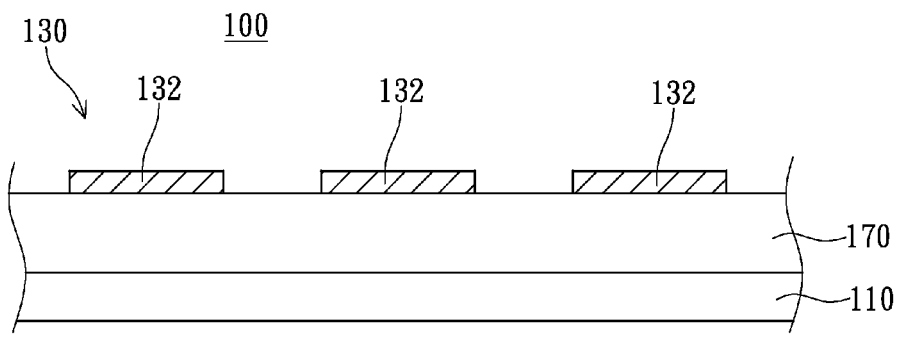
Figure 2G:
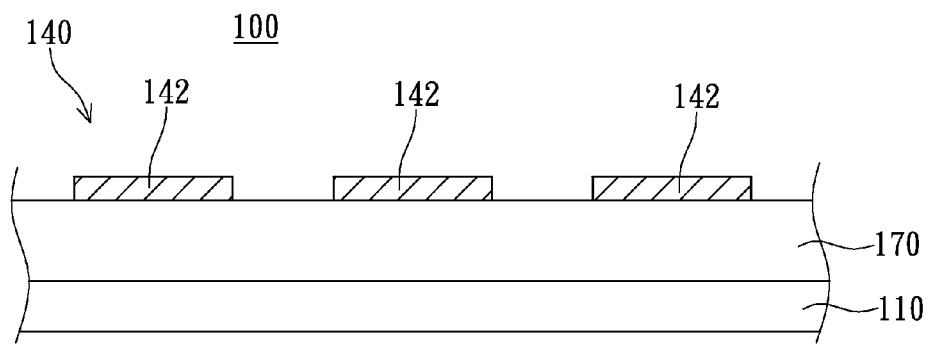

Please refer to FIGS. 1B and 2E. The method further includes a step of forming the second connection wires 122w, the first traces 150, and the second traces 160. At the moment, each second connection wires 122w may connect between two adjacent second sensing pattern units 122p through two of the contact holes 172, for allowing the second connection wires 122w and the second sensing pattern units 122p to form a plurality of second sensing strips 122. The second sensing strips 122 and the first sensing strips 121 are interlaced with one another, in order to form the touch sensing array 120. In addition, the first traces 150 may electrically connect with corresponding first sensing strips 121 or the second sensing strips 122 through the contact holes 172, and the second traces 160 may also electrically connect with corresponding first sensing strips 121 or the second sensing strips 122 through the contact holes 172.

Please refer to FIGS. 2D to 2G. When the second connection wires 122w, first traces 150, and the second traces 160 are formed, the first pad set 130 and the second pad set 140 are also formed on the insulation layer 170. The first traces 150 are connected to the corresponding first pads 132, and the second traces 160 are connected to the corresponding second pads 142. At this moment, the touch panel 100 is almost manufactured.

In addition, the second connection wires 122w, the first traces 150, the second traces 160, the first pad set 130, and the second pad set 140 may be formed at the same time, and may be formed by patterning a metal layer 20. Specifically, the metal layer 20 may be formed on the insulation layer 170 in advance. The metal layer 20 covers the insulation layer 170 thoroughly, and extends into the contact holes 172. Then, the metal layer 20 may be patterned for partially exposing the insulation layer 170. The manner of patterning may be photolithography or etching.

Figure 2H:
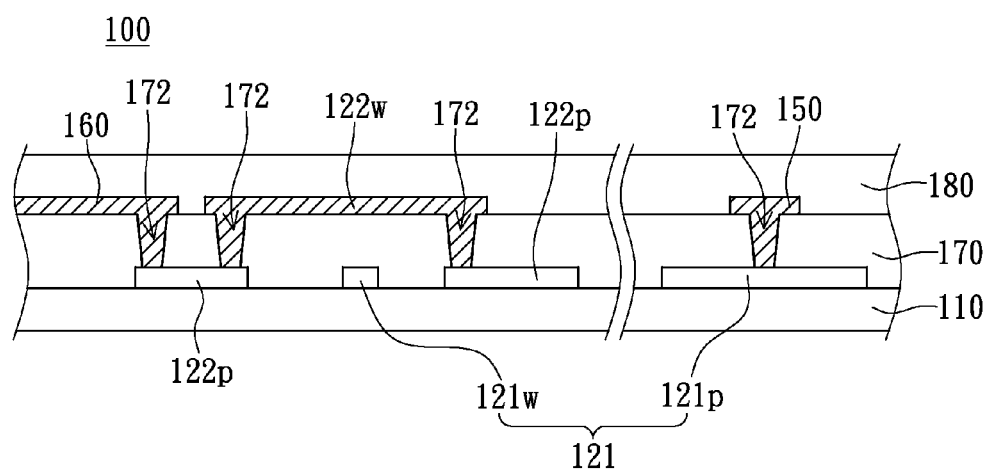

Please refer to FIG. 2H. In this embodiment, after forming the second connection wires 122w, the first traces 150, the second traces 160, the first pad set 130, and the second pad set 140, a protection layer 180 for covering the second connection wires 122w and the insulation layer 170 may be formed. However, in other embodiments, the touch panel 100 may have no protection layer 180, thus the step of forming the protection layer 180 shown in FIG. 2H is only for explanation, and the present invention is not limited thereby.

Please refer to FIG. 1A. After forming the first traces 150, the second traces 160, the first pad set 130, and the second pad set 140, an electrical detection may be operated on the touch panel 100. Specifically, detection signals may be sent to the first pad set 130 for detecting whether the first traces 150 discontinue or not, and may be sent to the second pad set 140 for detecting whether the second traces 160 discontinue or not.

When the detection result shows that any of the first traces 150 is opened, the workers may electrically connect the control circuit board (not shown, such as a flexible circuit board) of the touch panel to the second pad set 140 rather than first pad set 130. On the other hand, when the detection result shows that any of the second traces 160 is opened, the workers may electrically connect the control circuit board of the touch panel to the first pad set 130 rather than second pad set 140. Therefore, when one set of the traces (such as first traces 150) of the touch panel 100 discontinues, the circuit board may be connected to the pad set (such as the second pad set 140) corresponding to another set of traces (such as the second traces 160), for reducing the probability of connecting the circuit board to the opened traces, and thus increasing the production yield.

Figure 2I:
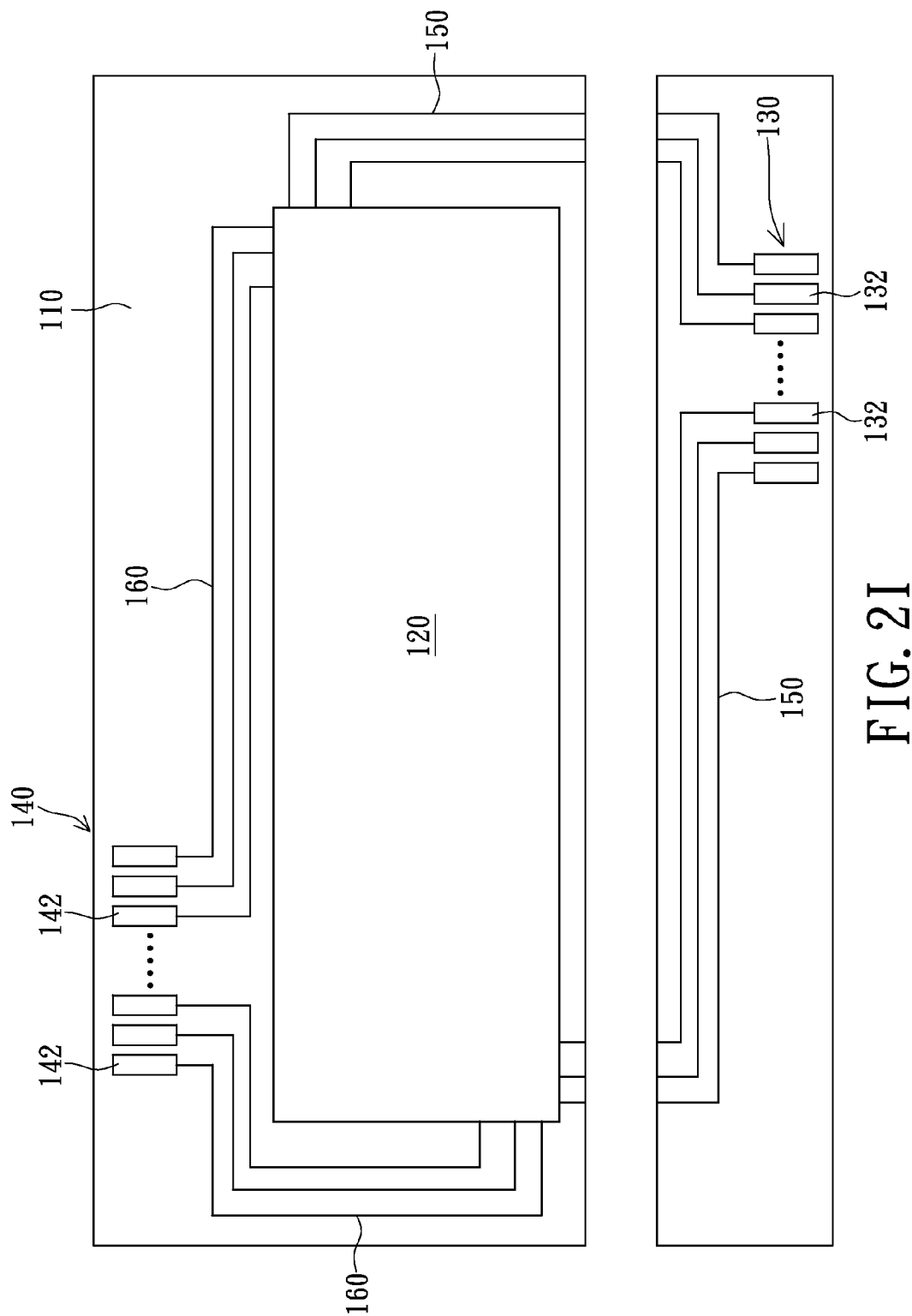
Figure 2J:
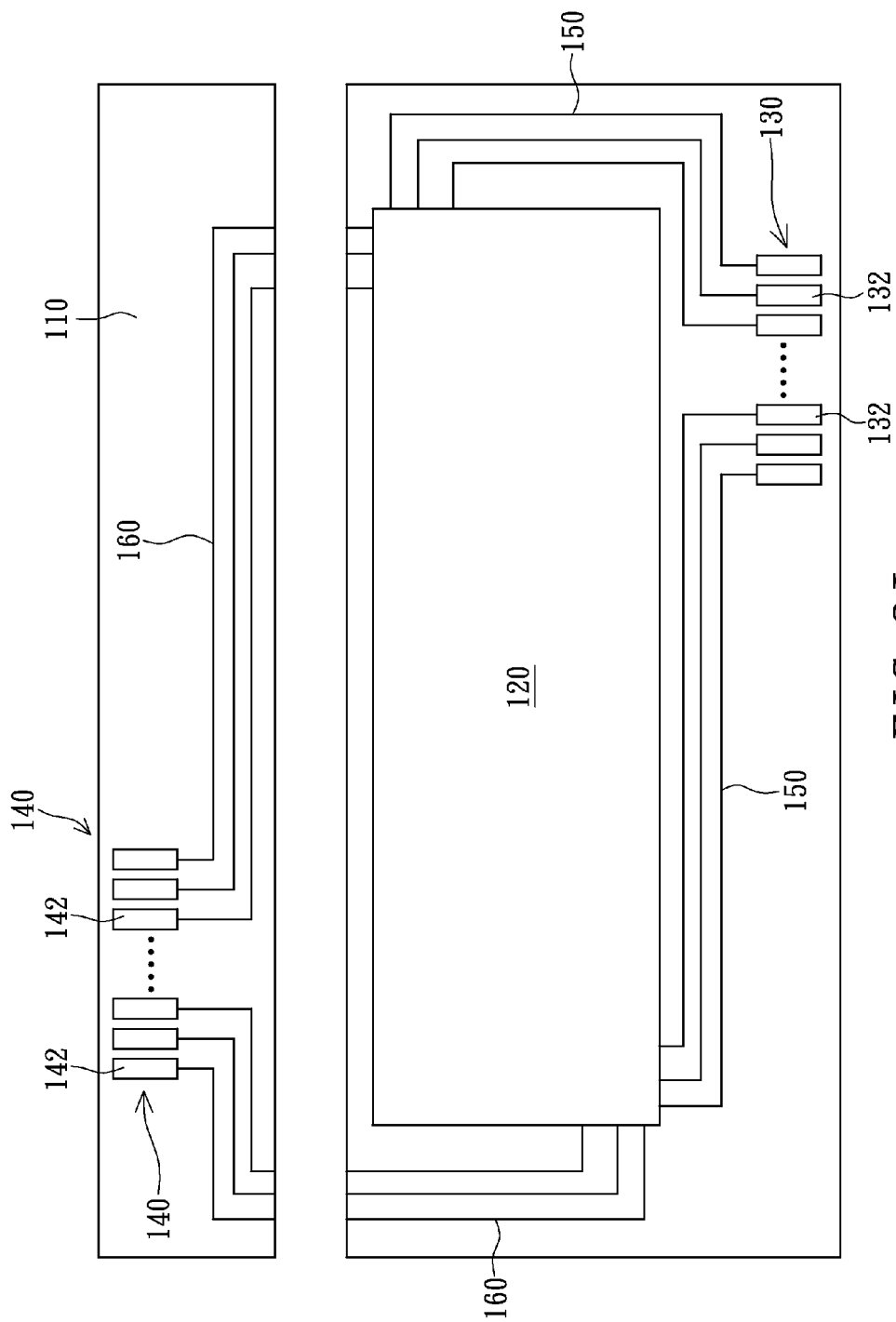

In addition, when the detection result shows that the first trace 150 is opened, the substrate 110 may be cut, for separating the first pad set 130 and part of the first traces 150 from the touch sensing array 120. As shown in FIG. 2I, the rest of the first traces 150 are remained on the touch panel, and the control circuit is electrically connected to the second pad set 140. At the moment after the substrate 110 is cut, the two terminals of each of the first sensing strips 121 and the second sensing strips 122 of the touch sensing array 120 are still respectively connected to a first trace 150 with a cutting cross-section and an intact second trace 160. On the other hand, when the detection result shows that the second trace 160 is opened, the substrate 110 may be cut, for separating the second pad set 140 and part of the second traces 160 from the touch sensing array 120. As shown in FIG. 2J, the rest of the second traces 160 are remained on the touch panel, and the control circuit is electrically connected to the first pad set 130. At the moment after the substrate 110 is cut, the two terminals of each of the first sensing strips 121 and the second sensing strips 122 of the touch sensing array 120 are still respectively connected to a second trace 160 with a cutting cross-section and an intact first trace 150.

Figure 3A:
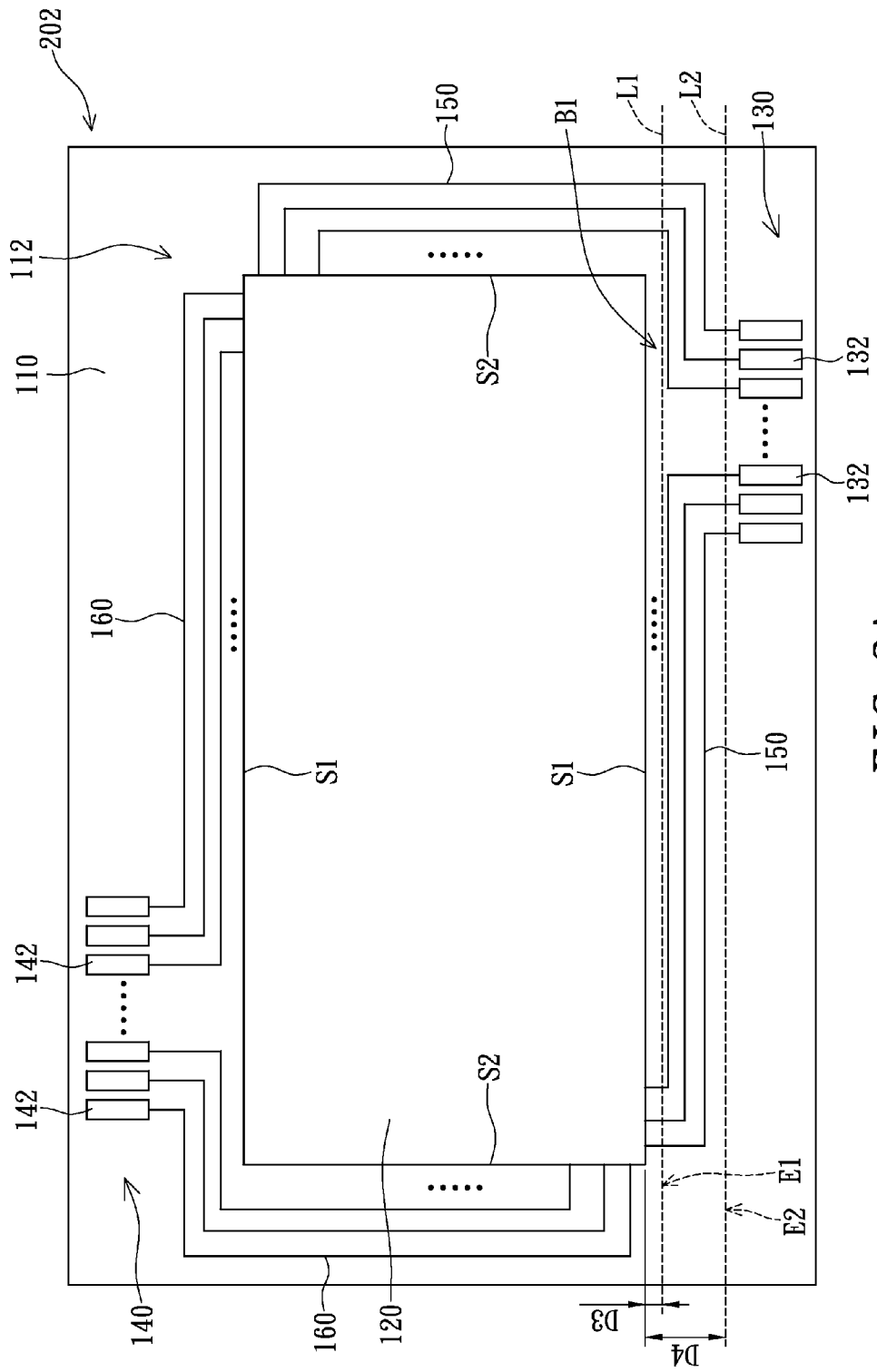
FIGS. 3A and 3B show top views of the exemplary cutting patterns of the touch panel in FIG. 1A.
Figure 3B:
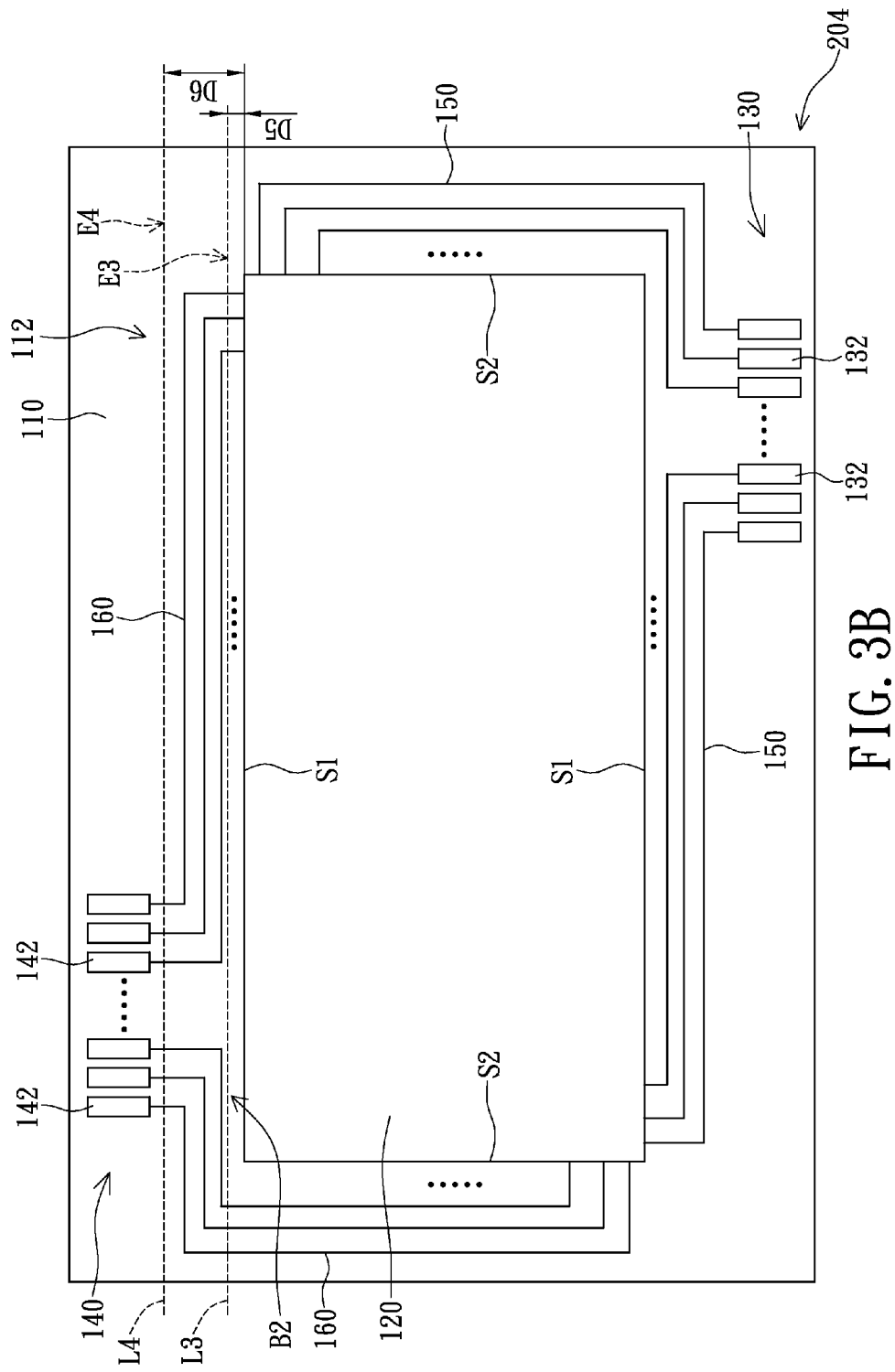

FIGS. 3A and 3B show top views of the exemplary cutting patterns of the touch panel in FIG. 1A. Please refer to FIG. 3A, when the detection result shows that the first trace 150 is opened, the substrate 110 may be cut along the cutting line L1 or L2, for separating the first pad set 130 and part of the first traces 150 from the touch sensing array 120, and forming a touch panel 202. The touch panel 202 not only includes the touch sensing array 120, the second traces 160, and the cut first traces 150, but also includes a second pad set 140 which has a plurality of second pads 142.

After the substrate 110 is cut along the cutting line L1 or L2, the plane surface 112 of the substrate 110 may have a straight line cutting edge E1 or E2, and the touch sensing array 120 may be located between one of the two straight line cutting edges E1 and E2 and the second pad set 140. The straight line cutting edge E1 is formed after the substrate 110 is cut along the line L1, and the straight line cutting edge E2 is formed after the substrate 110 is cut along the line L2.

No matter the substrate 110 is cut along the cutting line L1 or L2, the first traces 150 are all cut. Thus, in the touch panel 202, even though the first traces 150 are still connected to the touch sensing array 120, the first traces 150 are separated from the first pad set 130. Therefore, the detection signals of the control circuit board cannot be inputted from the first traces 150 to the touch sensing array 120. The first traces 150 of the touch panel 202 may lose the capabilities of transmitting the detection signals and thus serve as invalid traces.

On the other hand, the second traces 160 of the touch panel 202 are still electrically connected between the second pad set 142 and the touch sensing array 120. Thus, the detection signals of the control circuit board may still be transmitted from the second traces 160 to the touch sensing array 120 through the second pad set 140. That is, the second traces 160 of the touch panel 202 still have the capabilities of transmitting the detection signals, and thus serve as several valid traces.

As shown in FIG. 3A, in touch panel 202, the first traces 150 (which are invalid) extend from the touch sensing array 120 to the straight line cutting edge E1 or E2. Specifically, the touch sensing array 120 may have a pair of relative first lateral sides 51 and a pair of relative second lateral sides S2. The straight line cutting edges E1 and E2 are parallel to the first lateral sides S1, and the first traces 150 may extend from the adjacent first lateral side S1 and second lateral side S2 to the straight line cutting edge E1 or E2. That is, the cutting cross-sections of the first traces 150 may be aligned with straight line cutting edge E1 or E2.

In addition, the interval distance between the first lateral side 51 and the straight line cutting edge E1 or E2 under the touch sensing array 120 may be ranged between 2 mm to 10 mm. For example, the distance D3 between the touch sensing array 120 and the straight line cutting edge E1 may be 2 mm or more than 2 mm, and the distance D4 between the first lateral side 51 under the touch sensing array E2 and the straight line cutting array 120 may be 10 mm or less than 10 mm. The distance D3 or D4 may be selected according to the requirements of the sizes of the products, and is not limited by the mentioned range value. In addition, no matter the substrate 110 is cut along the cutting line L1 or L2, a band-shaped region B1 may be located between the touch sensing array 120 and the straight line cutting edge E1 or E2.

Specifically, after the substrate 110 is cut along the cutting line L1, the band-shaped region B1 may be formed between the touch sensing array 120 and the straight line cutting edge E1, and the shape of at least one first trace 150 in the band-shaped region B1 is a straight line. After the substrate 110 is cut along the cutting line L2, the band-shaped region B1 may be formed between the touch sensing array 120 and the straight line cutting edge E2, and the shape of at least two first traces 150 at the surrounding of the band-shaped region B1 are polygonal lines.

Similarly, please refer to FIG. 3B. When the detection result shows that the second traces 160 are opened, the substrate 110 may be cut along the cutting line L3 or L4, for separating the second pad set 140 and part of the second traces 160 from the touch sensing array 120, in order to form a touch panel 204, which is similar to the touch panel 202 in FIG. 3A. The touch panel 204 not only has the touch sensing array 120, several intact first traces 150, and several cut second traces 160, but also includes a first pad set 130.

After the substrate 110 is cut along the cutting line L3 or L4, the plane surface 112 of the substrate 110 may have a straight line cutting edge E3 or E4. After that, the second traces 160 may all be cut, thus even though certain parts of the second traces 160 are still connected with the touch sensing array 120, they are separated from the second pad set 140 and thus serve as several invalid traces. On the other hand, the first traces 150 of the touch panel 204 are still electrically connected between the first pads 132 and the touch sensing array 120, and thus serve as several valid traces.

The interval between the touch sensing array 120 and the straight line cutting edge E3 or E4 may also be ranged between 2 mm to 10 mm. Moreover, the operation manners of this embodiment are similar to those in the embodiment of FIG. 3A, thus they are not described repeatedly.

Figure 4A:
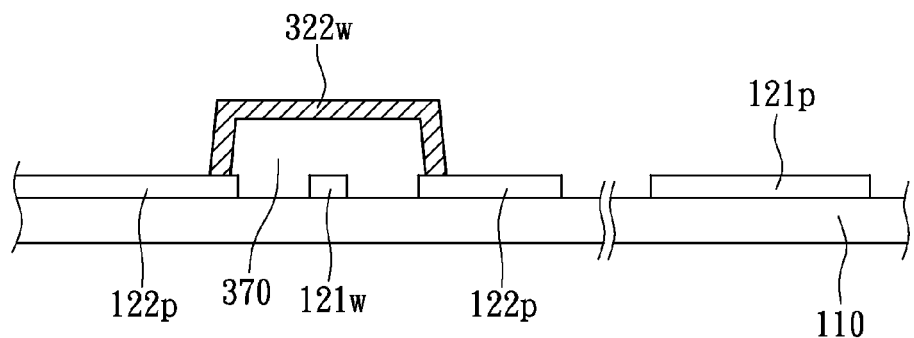
FIGS. 4A and 4B shows a cross section diagram of a touch panel according to another embodiment of the present invention.
Figure 4B:
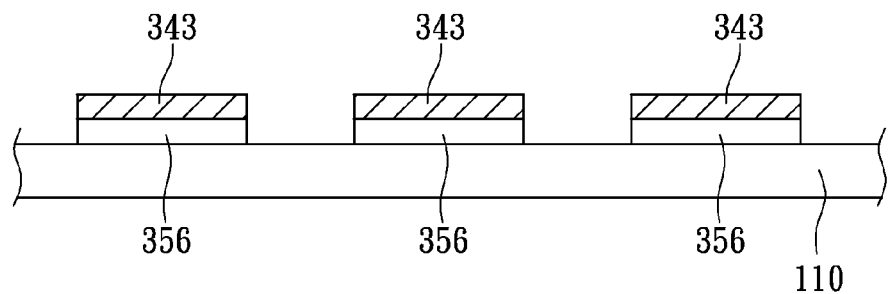

It is worth noting that, the aforementioned FIGS. 1B to 1E and FIGS. 2A to 2H show only some exemplary embodiments of the structure and manufacturing method of the touch sensing array 120, the first pad set 130, and the second pad set 140, and the scope of the present invention is not limited thereby. Practically, the structure and manufacturing method of the touch sensing array 120, the first pad set 130, and the second pad set 140 may has several implementations. For example, FIGS. 4A and 4B show cross section diagrams of the touch panel according to another embodiment of the present invention. Please refer to FIGS. 4A and 4B, the arrangement designs of the first traces 150 and the second traces 160 of the touch panel 300 in this embodiment are approximately the same as those in the touch panel 100 of the mentioned embodiment (please refer to FIG. 1A), and the structure designs of the touch sensing array 120, the first pad set 130, and the second pad set 140 are slightly different from those in the touch panel 100 of the mentioned embodiment (please refer to FIG. 1C). That is, the structures of the touch panel 300 and the touch panel 100 are approximately the same in aerial views (please refer to FIGS. 1A and 1B). The differences between the touch panel 300 and touch panel 100 are that the touch sensing array 120 of the touch panel 300 only includes an insulation pattern layer 370 which partially covers the substrate 110 and locates between two adjacent second sensing pattern units. In addition, the traces 356 included in the touch panel 300 are formed by transparent conductive layer. Moreover, the pad sets of the touch panel 300 are formed by a metal layer 20 which has a transparent conductive layer thereunder for forming traces 356, as shown in FIG. 4B.

Please refer to FIG. 4A. In the touch panel 300, the first sensing pattern units 121$p$, the first connection wires 121$w$, the second sensing pattern units 122$p$, and the insulation pattern layer 370 are all disposed on the substrate 110. The insulation pattern layer 370 only covers the first connection wires 121$w$, and does not cover the first sensing pattern units 121$p$ and the second sensing pattern units 122$p$. The second connection wires 322$w$ are disposed on the insulation pattern layer 370, and extend to two adjacent second sensing pattern units 122$p$ for electrically connecting with the two. In addition, the touch panel 300 of FIG. 4A may be covered by a protection layer 180 (not shown in FIG. 4A) as shown in FIG. 1C.

Please refer to FIG. 4B. The touch panel 300 may further include several pads 343 and several traces 356. The pads 343 are disposed and contact with the traces 356. That is, the traces 356 (corresponding to the first or second traces of the touch panel 300) shown in FIG. 4B extend under the pads 343 (corresponding to the first or second pads of the touch panel 300). In addition, when the touch panel 300 is covered with a protection layer 180, the protection layer 180 may have at least one opening for exposing the first pad set or the second pad set, in order to allow the control circuit board to electrically connect with it.

It is worth noting that, generally, the structures of the first traces and the second traces may be formed from a single transparent conductive layer, a single metal layer, or a double layer structure including both the transparent conductive layer and the metal layer. The stacking position of the transparent conductive layer and the metal layer is not refined. The first pad set and the second pad set may be formed from a metal layer or a double layer structure including the metal layer and the transparent conductive layer. Therefore, no matter the inner structure of the touch sensing array, the structure of the traces, or the structure of the pad sets, there are many implementations of them, and does not described thoroughly herein.

Accordingly, because the touch panel of the present invention includes more than one set of pads (such as the first pad set 130 and the second pad set 140), the touch panel may work normally and does not need to be scrapped when one of the pad sets does not work. Therefore, the possibility of scrapping the touch panel is reduced according to the present invention, in order to reduce the cost of products and to increase the product yields.

In addition, because the first pads and the second pads are in a point symmetric arrangement with respect to the touch sensing array, the first pad set and the second pad set may be electrically connected to the circuit boards normally by rotating the touch panel by 180 degrees (please refer to FIG. 1A) when the touch panel is bounding with the circuit boards, for simplifying the manufacturing processes. Therefore, the workers may combine the touch panel with the circuit board in a simple way, thus reducing unnecessary wastes of time.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A touch panel, comprising:
    a substrate;
    a touch sensing array disposed at the substrate;
    a first pad set including a plurality of first pads, and being disposed at the substrate;
    a second pad set including a plurality of second pads, and being disposed at the substrate, wherein the touch sensing array is located between the first pad set and the second pad set, and the first pads and the second pads are in a point symmetric arrangement with respect to the touch sensing array;
    a plurality of first traces electrically connected between the first pads and the touch sensing array; and
    a plurality of second traces electrically connected between the second pads and the touch sensing array.

2. The touch panel according to claim 1, wherein a number of the first pads equals to a number of the second pads.

3. The touch panel according to claim 1, wherein an interval between two adjacent first pads equals to an interval between two adjacent second pads.

4. The touch panel according to claim 1, wherein the first pads and the second pads are arranged in a line respectively along a border of the touch sensing array.

5. The touch panel according to claim 1, wherein the touch sensing array includes:
    a plurality of first sensing strips which are juxtaposed with one another; and
    a plurality of second sensing strips which are interlaced with the first sensing strips.

6. The touch panel according to claim 5, wherein two terminals of every first sensing strip and second sensing strip are connected to one of the first traces and one of the second traces respectively.

7. The touch panel according to claim 6, wherein each of the first sensing strips includes a plurality of first sensing pattern units and a plurality of first connection wires, and each of the first connection wires are connected between two adjacent first sensing pattern units; and each of the second sensing strips includes a plurality of second sensing pattern units and a plurality of second connection wires, each of the second connection wires are connected between two adjacent second sensing pattern units, and the second connection wires are respectively disposed above the first connection wires.

8. The touch panel according to claim 7, wherein the first connection wires are transparent wires, and the second connection wires are metal lines.

9. The touch panel according to claim 7, further comprising an insulation layer covering the first sensing strips and the second sensing pattern units, and the second connection wires are disposed on the insulation layer.

10. The touch panel according to claim 9, wherein the first traces, the second traces, the first pad set, and the second pad set are disposed on the insulation layer.

11. The touch panel according to claim 10, further comprising a protection layer covering the second connection wires and the insulation layer.

12. The touch panel according to claim 7, further comprising a insulation pattern layer covering the first connection wires, wherein the part of the insulation pattern layer covers the substrate, and the second connection wires are disposed on the insulation pattern layer and is used for electrically connecting two adjacent second sensing pattern units.

13. The touch panel according to claim 1, wherein the first pads are disposed on the first traces and contact with the first traces, and the second pads are disposed on the second traces and contact with the second traces.

14. The touch panel according to claim 1, wherein the first traces and the second traces are in a point symmetric arrangement with respect to the touch sensing array.

15. A touch panel, comprising:
    a substrate having a plane surface which has a straight line cutting edge;
    a pad set including a plurality of pads which are disposed on the plane surface;
    a touch sensing array disposed on the plane surface and locating between the straight line cutting edge and the pad set;
    a plurality of valid traces electrically connected between the pads and the touch sensing array; and
    a plurality of invalid traces disposed between the touch sensing array and the straight line cutting edge, and extending from the touch sensing array to the straight line cutting edge.

16. The touch panel according to claim 15, wherein cutting sections of the invalid traces are aligned with the straight line cutting edge.

17. The touch panel according to claim 15, wherein the touch sensing array has a pair of first lateral sides which are relative to each other and a pair of second lateral sides which are relative to each other, the straight line cutting edge are paralleled to the first lateral sides, and the invalid traces extends from the adjacent first lateral side and second lateral side to the straight line cutting edge.

18. The touch panel according to claim 15, wherein an interval between the touch sensing array and the straight line cutting edge are ranged between 2 mm to 10 mm.

19. The touch panel according to claim 15, wherein a band-shaped region is located between the touch sensing array and the straight line cutting edge, and a shape of at least one of the invalid trace located within the band-shaped region is a line or a polygonal line.

20. The touch panel according to claim 15, wherein the touch sensing array includes:
   a plurality of first sensing strips which are juxtaposed with one another; and
   a plurality of second sensing strips which are interlaced with the first sensing strips.

21. The touch panel according to claim 20, wherein two terminals of each of the first sensing strips and the second sensing strips are respectively connected to one of the valid traces and one of the invalid traces.

22. The touch panel according to claim 21, wherein each of the first sensing strips includes a plurality of first sensing pattern units and a plurality of first connection wires, and each of the first connection wires is connected between two adjacent first sensing pattern units; and each of the second sensing strips includes a plurality of second sensing pattern units and a plurality of second connection wires, wherein each of the second connection wires is connected between two adjacent second sensing pattern units and is disposed above the first connection wires.

23. A method for manufacturing a touch panel, comprising:
   forming a plurality of first sensing strips which are juxtaposed with one another and a plurality of second sensing pattern units on a substrate, wherein each of the first sensing strips includes a plurality of first sensing pattern units and a plurality of first connection wires connecting with the first sensing pattern units, and each of the first connection wires is located between two adjacent first sensing pattern units and between two adjacent second sensing pattern units;
   forming an insulation layer which covers the first sensing strips and the second sensing pattern units, wherein the insulation layer has a plurality of contact holes, the two adjacent second sensing pattern units are partially exposed by two of the contact holes respectively, and the first sensing pattern unit is partially exposed by one of the contact holes, thereby forming a touch sensing array;
   forming a plurality of second connection wires on the insulation layer, wherein each of the second connection wires is connected between two adjacent second sensing pattern units through two of the contact holes;
   forming a first pad set and a second pad set on the insulation layer, wherein the touch sensing array locates between the first pad set and the second pad set, the first pad set includes a plurality of first pads, the second pad set includes a plurality of second pads, and the first pads and the second pads are in a point symmetric arrangement with respective to the touch sensing array; and
   forming a plurality of first traces and a plurality of second traces on the insulation layer, wherein the first traces connect with the first pads and the touching sensing array, and the second traces connect with the second pads and the touch sensing array.

24. The method for manufacturing the touch panel according to claim 23, wherein the first sensing strips and the second sensing pattern units are formed by patterning a conductive layer.

25. The method for manufacturing the touch panel according to claim 24, wherein the conductive layer is a transparent conductive layer.

26. The method for manufacturing the touch panel according to claim 23, wherein the second connection wires, the first pad set, the second pad set, the first traces, and the second traces are formed by patterning a metal layer.

27. The method for manufacturing the touch panel according to claim 23, further comprising:
   detecting the first traces from the first pad set; and
   detecting the second traces from the second pad set.

28. The method for manufacturing the touch panel according to claim 27, further comprising:
   cutting the substrate for separating the first pad set from the touch sensing array when the detection indicates that the first trace is opened; and
   cutting the substrate for separating the second pad set from the touch sensing array when the detection indicates that the second trace is opened.

29. The method for manufacturing the touch panel according to claim 23, further comprising a step of forming a protection layer which covers the second connection wires and the insulation layer.

* * * * *